(12) United States Patent
Schulz et al.

(10) Patent No.: US 9,346,190 B2
(45) Date of Patent: May 24, 2016

(54) DEVICE FOR PROCESSING MATERIAL BY MIXING AND/OR PLASTICATING

(76) Inventors: Helmuth Schulz, Linz (AT); Günther Klammer, Aschbach Markt (AT)

(*) Notice: Subject to any disclaimer, the term of this patent is extended or adjusted under 35 U.S.C. 154(b) by 244 days.

(21) Appl. No.: 13/575,130

(22) PCT Filed: Jun. 9, 2010

(86) PCT No.: PCT/AT2010/000204
§ 371 (c)(1),
(2), (4) Date: Jan. 14, 2013

(87) PCT Pub. No.: WO2011/153557
PCT Pub. Date: Dec. 15, 2011

(65) Prior Publication Data
US 2013/0107659 A1    May 2, 2013

(51) Int. Cl.
| | |
|---|---|
| *B29B 7/00* | (2006.01) |
| *B29B 7/48* | (2006.01) |
| *B29C 47/08* | (2006.01) |
| *B29C 47/38* | (2006.01) |
| *B29C 47/40* | (2006.01) |
| *B29C 47/60* | (2006.01) |
| *B29C 47/00* | (2006.01) |

(52) U.S. Cl.
CPC . *B29B 7/48* (2013.01); *B29B 7/484* (2013.01); *B29C 47/0861* (2013.01); *B29C 47/38* (2013.01); *B29C 47/402* (2013.01); *B29C47/406* (2013.01); *B29C 47/6012* (2013.01); *B29C 47/0009* (2013.01)

(58) Field of Classification Search
CPC .......... B29B 7/186; B29B 7/48; B29C 47/38; B29C 47/402; B29C 47/6012
USPC .............................. 366/82, 83, 84, 85, 88, 89
See application file for complete search history.

(56) References Cited

U.S. PATENT DOCUMENTS

| | | | |
|---|---|---|---|
| 3,288,077 A | 11/1966 | Meskat | |
| 4,047,705 A * | 9/1977 | Hanslik | ........................... 366/85 |

(Continued)

FOREIGN PATENT DOCUMENTS

| | | |
|---|---|---|
| AT | 503 371 | 9/2007 |
| DE | 846 012 | 8/1952 |

(Continued)

OTHER PUBLICATIONS

International Search Report of PCT/AT2010/000204, date of mailing Mar. 16, 2011.

*Primary Examiner* — Tony G Soohoo
*Assistant Examiner* — Anshu Bhatia
(74) *Attorney, Agent, or Firm* — Collard & Roe, P.C.

(57) ABSTRACT

The invention relates to a device for processing material by mixing and/or plasticating, comprising at least two conical screws (2, 3) which are arranged next to each other in a common screw casing (1) and the flights of which engage with one another and are driven to rotate in the same direction of rotation about the respective screw axis (4, 5) by at least one motor, with the material that is to be processed being fed to the screws (2, 3) through at least one feed opening (6) in the screw casing (1) which is arranged in the feed zone (E) of one end face of the screws (2, 3), and with the material that has been processed by the screws (2, 3) leaving the screw casing (1) through at least one outlet opening (7) in the screw casing (1) that is arranged in the discharge zone (A) of the other end face of the screws (2, 3). In order to provide advantageous plasticating conditions it is proposed that the ratio of the numerical values of the screw outside diameter (c, d) to the profile overlap, i.e. to the overlapping area of the two screws (2, 3), both in the feed zone (E) and in the discharge zone (A) is in the range of between one to one and one to two.

5 Claims, 2 Drawing Sheets

(56) References Cited

U.S. PATENT DOCUMENTS

| | | | |
|---|---|---|---|
| 4,247,206 A | | 1/1981 | Zahradnik |
| 6,609,819 B2 * | | 8/2003 | Hauck et al. .................... 366/85 |
| 7,632,006 B2 | | 12/2009 | Schulze |
| 2009/0040863 A1 * | | 2/2009 | Blach ............................ 366/85 |

FOREIGN PATENT DOCUMENTS

| | | |
|---|---|---|
| DE | 15 29 812 | 3/1970 |
| JP | 55 051543 | 4/1980 |
| JP | 2002 355879 | 12/2002 |

* cited by examiner

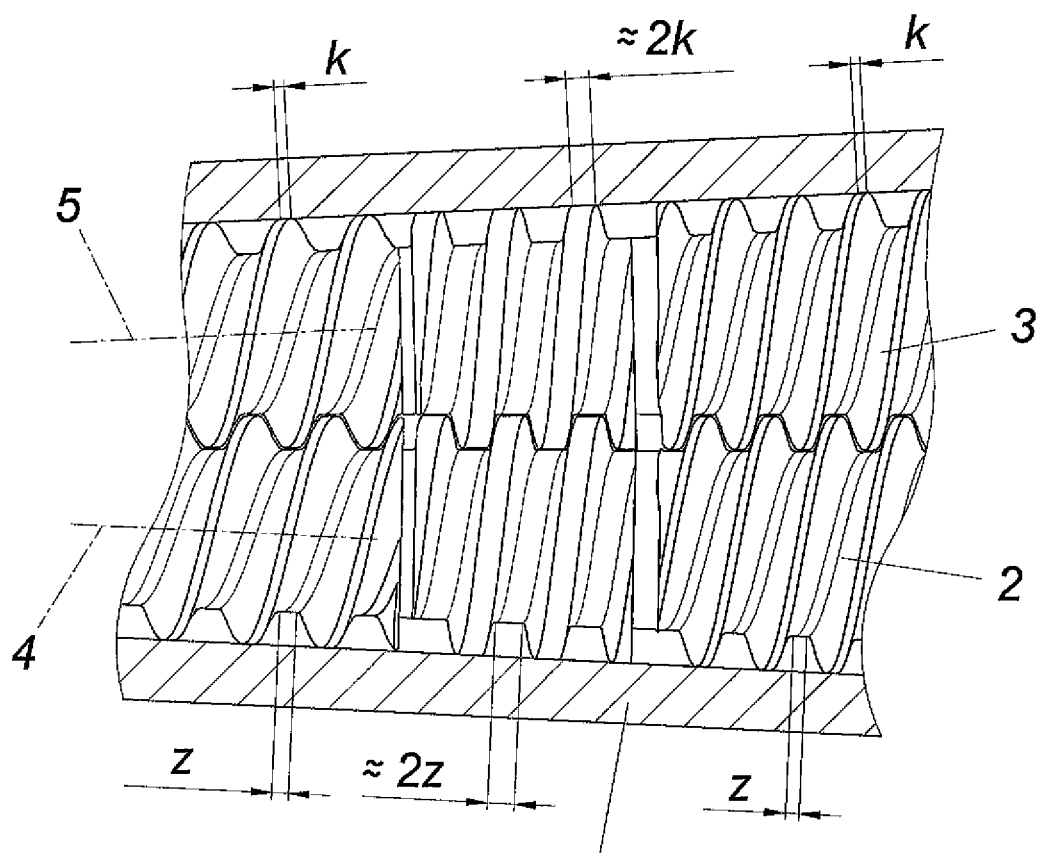
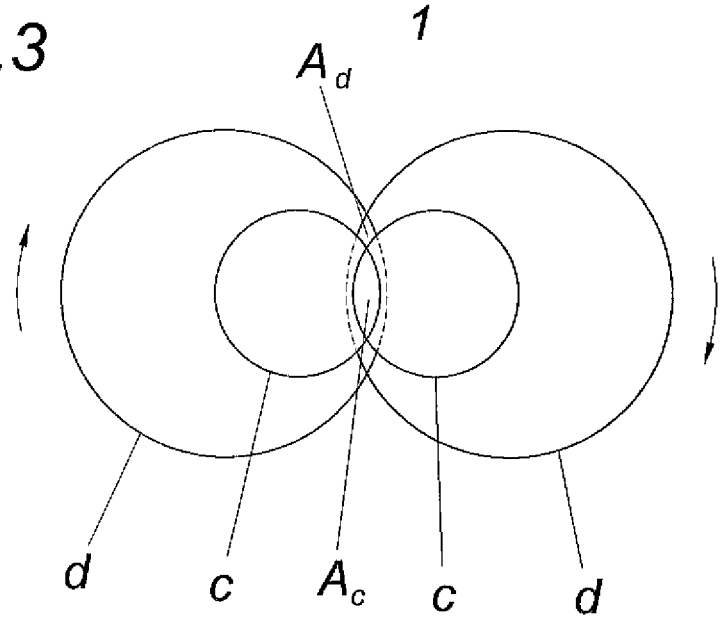

DEVICE FOR PROCESSING MATERIAL BY MIXING AND/OR PLASTICATING

CROSS REFERENCE TO RELATED APPLICATIONS

This application is the National Stage of PCT/AT2010/000204 filed on Jun. 9, 2010, the disclosure of which is incorporated by reference. The international application under PCT article 21 (2) was not published in English.

FIELD OF THE INVENTION

The invention relates to a device for processing material by mixing and/or plasticating, comprising at least two conical screws which are arranged next to each other in a common screw casing and the flights of which engage with one another and are driven to rotate in the same direction of rotation about the respective screw axis by at least one motor, with the material that is to be processed being fed to the screws through at least one feed opening in the screw casing that is arranged in the feed zone of one end face of the screws and the material that has been processed by the screws leaving the screw casing through at least one outlet opening in the screw casing that is arranged in the discharge zone of the other end face of the screws.

DESCRIPTION OF THE PRIOR ART

Such devices are especially also suitable for processing plastic waste intended for recycling. Frequently, such double-screw extruders are used for mixing various types of polyolefins or for compounding plastic materials of a large variety of types. Usually, these materials are provided as loose bulk material, the specific weight of which is comparatively low, which again leads to the consequence that for achieving a sufficient throughput it is necessary to draw large quantities of material to be processed into the feed region of the screws. These quantities of material need to be plasticated or homogenized to the desired extent in the course of the transport occurring by the screws and by the melting down, degassing and sealing that occurs there from the inlet opening to the outlet opening in order to obtain desired quality of the material in the region of the outlet opening. This problem can be solved to a certain extent by the choice of a suitable geometry of the flights. This is contradicted however in that the conditions in the plastic material to be processed are not always the same, especially concerning the size of the materials to be processed and also their type of material, degree of contamination, etc. The use of known double-screw extruders has proven to be far from satisfactory in this respect too.

In order to further improve the mixing ratio in such devices as known from DE 15 29 812 A1, it is known (AT 503 371 A) to arrange the two screws as components of a double-screw extruder with conical screws which are driven with the same direction of rotation, with harmonic waves being applied to the rotational speeds of the screws. Such extruders are well suitable for processing recycling materials and an improvement concerning the thorough mixture and processing of the material is achieved. However, these known extruders have a conveying rate that is not convincing.

SUMMARY OF THE INVENTION

On the basis of a state of the art of the kind mentioned above, the invention is based on the object of providing a device for processing plastic materials which ensures thorough mixture and homogenization of the plastic material in combination with an improved conveying rate.

This object is achieved by the invention in such a way that the ratio of the numerical values of the screw outside diameter to the profile overlap, i.e. to the overlapping area of the two screws, is in the range of between one to one and one to two both in the feed zone and in the discharge zone.

It was surprisingly noticed that when providing the ratios in accordance with the invention, especially depending on the overlapping areas of the two areas in the feed zone on the one hand and also in the discharge zone on the other hand, improved conditions for the conveying effect are achieved when the ratio of the numerical values of the screw outside diameter to the profile overlap is in the range of one to one and one to two. It was surprisingly noticed that massively higher rotational speeds for the extruders screws can be realized with such devices and there will be much lower wear and tear in comparison with the known devices. The reduced wearing effect is obtained by spreading forces which are reduced to a considerable extent in comparison with counter-rotating screws because the plastic material to be molten down is virtually conveyed about both conveying screws in a revolving fashion and no shearing forces or spreading forces are produced which cause the wearing forces and which press the extruders screws against the jacket surface of the casing. As a result of these conditions, an improved thorough mixing of the plastic melt is further generally achieved. It is especially advantageous in this respect when the ratio of screw diameter to profile overlap, i.e. to the overlapping area of both screws from the feed zone to the discharge zone, i.e. over the entire engagement length of both screws, is at least approximately equal.

Even with the same size, devices in accordance with the invention have a considerably improved throughput rate in comparison with the state of the art. The conical extruder screws which revolve in the same direction comprise different zones in the conventional manner, especially a feed zone, a melting zone, a mixer, degassing, and a conveying zone which builds up a respective dynamic pressure and homogenizes the melt for discharging the molten plastic from the device. In order to enable the melting of a large variety of compositions of plastic granulate to be molten evenly in the device, especially plastic granulate with low or higher apparent density, it is recommended that the ratio of the maximum profile overlap height in the discharge zone to the profile overlap height in the feed zone is in the range of between one to one and one to four, said maximum profile overlap height corresponding at least approximately to the flight depth of a screw.

Similarly, the conicity of the screw can be adjusted accordingly, with the ratio of the screw outside diameter in the discharge zone to the screw outside diameter in the feed zone preferably being in the range of between one to one and one to four.

For the ratio of the screw outside diameter in the discharge zone to the screw length, it is recommended that this ratio lies in the range of between 1 to 20 and 1 to 50.

Especially advantageous conditions are achieved when the conical screws comprise at least three, preferably five sections in the longitudinal direction of the screw, of which the mutually adjacent sections are provided with different gear toothings or toothing geometries.

In order to enable the clear separation of the various processing zones from one another and to improve the quality of the plastic to be produced, the mutually adjacent sections can comprise an at least equal gear toothing (concerning the module), with said mutually adjacent screw sections preferably having a different number of starts. The sections with a lower number of starts act in this case as flow throttles or as brakes, and therefore ensure that the continually required minimum dwell time of the plastic to be processed is ensured in the provided processing sections. If the one processing section is double-threaded for example and the adjacent processing section is arranged with a single thread, it is recommended that the screw section provided between two screw sections with at least approximately the same gear toothing geometry has a width of the tooth tip and base which is 1.5 to 2.5 times as large, preferably two times as large. The individual gear toothing sections can conventionally be produced in a separate manner and can optionally be screwed together by interposing spacers.

An especially preferred embodiment of an extruder in accordance with the invention is characterized in that the first screw section forms the feed and melting zone, the third screw section the degassing zone, and the fifth screw section the homogenization and discharge zone of an extruder which faces the discharge zone, and that the second and fourth screw section represent the throttling and especially the sealing zone, which are formed in such a way for example that said throttling and sealing zones are provided with a lower number of starts in comparison with the other sections. Furthermore, a separate mixing unit can be provided between the individual sections, which mixing unit comprises impellers arranged in elliptical form for example.

BRIEF DESCRIPTION OF THE DRAWINGS

The invention will be shown schematically in the drawings by reference to an embodiment, wherein:

FIG. 2 shows an enlarged sectional view of the device of FIG. 1 on an enlarged scale, and FIG. 3 shows a schematic view of the ratio of screw diameter to profile overlap, i.e. to the overlapping area of both screws, both in the feed zone and the discharge zone.

DESCRIPTION OF THE PREFERRED EMBODIMENT

Figure 1:
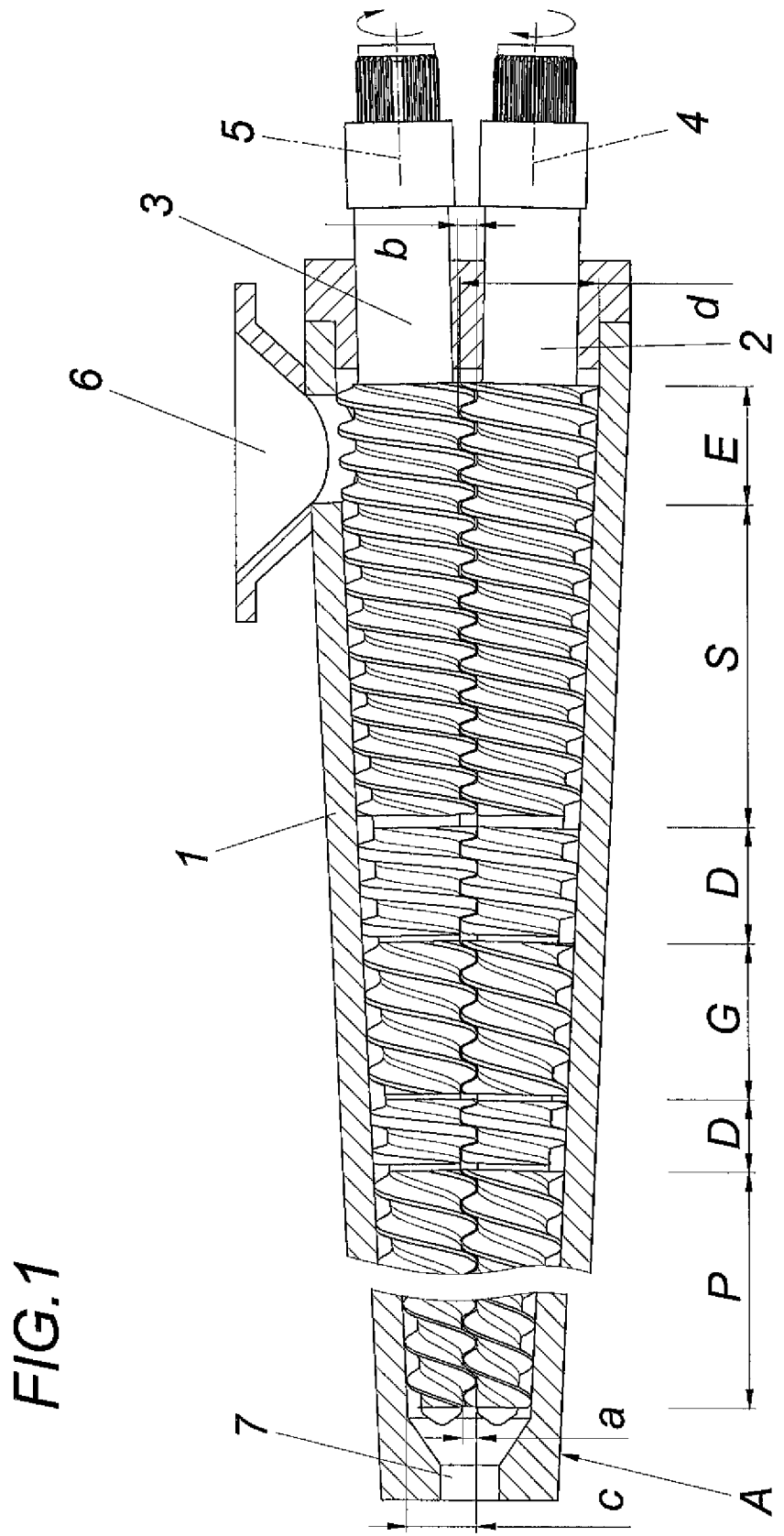
FIG. 1 shows the device in accordance with the invention in a partly sectional longitudinal view.

A device for processing material, especially plastic granulate, by mixing and/or plasticating comprises two conical screws 2, 3 which are arranged adjacent to one another in a common screw casing 1 and the flights of which are in engagement with one another and are driven to rotate in the same direction of rotation about the respective screw axis 4, 5 by at least one motor (not shown in closer detail), with the material that is to be processed being fed to the screws 2, 3 through at least one feed opening 6 in the screw casing 1 that is arranged in the feed zone E of one end face of the screws 2, 3, and with the material that has been processed by the screws 2, 3 leaving the screw casing 1 through at least one outlet opening 7 in the screw casing 1 that is arranged in the discharge zone A of the other end face of the screws 4, 5.

The illustrated device comprises conical screws 2, 3 which comprise five sections in the longitudinal direction of the screws, of which the mutually adjacent sections have different gear toothings. In particular, the mutually adjacent screw sections have an at least approximately similar toothing geometry; however, these screw sections have a different number of starts which differ in the illustrated embodiment by the factor of 1. That is why the single-thread screw section which is provided between two double-thread screw sections has a tip and root width (k, z) of the tooth which is 1.5 to 2.5 times as large.

In the illustrated embodiment, the first screw section forms the feed and melting zone E, S, the third screw section the degassing section G, and the fifth screw section the homogenization and pumping zone P facing the discharge zone, and the second and fourth screw section represent single-thread sealing areas D.

The ratio of the numerical values of the screw outside diameter c, d to the profile overlap, i.e. the overlapping area of the two screws 2, 3, both in the feed zone E as well as in the discharge zone A is in the range of one to one and one to two. The ratio of the maximum profile overlap height a in the discharge zone A to the profile overlap height b in the feed zone E is in the range of between one to one and one to four, said maximum profile overlap height a corresponding at least approximately to the flight depth of a screw 3, 4. Since the play between the individual screws should usually be minimal, this distance is not considered here. The ratio of screw outside diameter c in the discharge zone to the screw outside diameter d in the feed zone lies in the range of between one to one and one to four. The ratio of the screw outside diameter c in the discharge zone to the screw length E is in the range of between one to one and one to twenty.

$d/A_d$=1:1-1:2 (diameter/profile overlap area in the feed zone E)

$c/A_c$=1:1-1:2 (diameter/profile overlap area in the discharge zone A)

a/b=1:1-1:4 (flight depth)

c/d=1:1-1:4 (screw outside diameter)

c/screw length=1:20-1:50 and preferably $d/A_d$=$c/A_c$.

The profile overlap area A can be calculated according to the following formula:

$$A = \left[d^2\pi\left[\frac{\tan^{-1}\left[2\frac{\sqrt{\left(\frac{d}{2}\right)^2-\left(\frac{x}{2}\right)^2}}{x}\right]}{360}\right]\right] - \left[2\sqrt{\left(\frac{d}{2}\right)^2-\left(\frac{x}{2}\right)^2}\right]*\left[\frac{d}{2}-\frac{1}{2}(d-x)\right]$$

wherein d is the outside diameter of the screws and x the distance of the screw axes at the height of the profile overlap area to be calculated.

The invention claimed is:

1. A device for processing material by mixing and/or plasticating, comprising at least two conical screws which are arranged next to each other in a common screw casing and the flights of which engage with one another and are driven to rotate in the same direction of rotation about the respective screw axis by at least one motor, with the material that is to be processed being fed to the screws through at least one feed opening in the screw casing which is arranged in a feed zone of one end face of the screws, and with the material that has been processed by the screws leaving the screw casing through at least one outlet opening in the screw casing that is arranged in a discharge zone of the other end face of the screws, wherein a screw outside diameter to profile overlap ratio of the numerical values of the screw outside diameter to the profile overlap, both in the feed zone and in the discharge zone is in the range of between one to one and one to two, wherein the discharge zone has a maximum profile overlap height and the feed zone has a profile overlap height and a ratio of the maximum profile overlap height in the discharge zone to the profile overlap height in the feed zone is in the range of between one to one and one to four, said maximum profile overlap height corresponding to the flight depth of a screw, wherein the conical screws comprise at least first, second, and third sections in the longitudinal direction of the screw of which the mutually adjacent sections have different gear toothings, and wherein the mutually adjacent screw sections have an approximately similar toothing geometry, but have a different number of starts.

2. The device according to claim 1, wherein a discharge zone screw outside diameter to feed zone screw outside diameter ratio of the screw outside diameter in the discharge zone to the screw outside diameter in the feed zone is in the range of between one to one and one to four.

3. The device according to claim 1, wherein a screw outside diameter to screw length ratio of the screw outside diameter in the discharge zone to the screw length is in the range of between one to twenty and one to fifty.

4. The device according to claim 1, wherein the second screw section is provided between the first and third screw sections, the first and third screw sections having an approximately similar toothing geometry and the second screw section having a width of the tooth tip and tooth base which is 1.5 to 2.5 times as large.

5. The device according to claim 1, wherein the first screw section forms a melting zone, the third screw section forms a degassing zone and a fifth screw section forms a homogenization zone of an extruder which faces the discharge zone, and wherein the second section and a fourth screw section form sealing zones.

* * * * *